United States Patent
Li et al.

(10) Patent No.: US 11,263,767 B2
(45) Date of Patent: Mar. 1, 2022

(54) METHOD FOR PROCESSING IMAGE IN VIRTUAL REALITY DISPLAY DEVICE AND RELATED VIRTUAL REALITY DISPLAY DEVICE

(71) Applicants: BEIJING BOE OPTOELECTRONICS TECHNOLOGY CO., LTD., Beijing (CN); BOE TECHNOLOGY GROUP CO., LTD., Beijing (CN)

(72) Inventors: Zhifu Li, Beijing (CN); Mingyang Yan, Beijing (CN); Jinghua Miao, Beijing (CN); Yukun Sun, Beijing (CN); Wenyu Li, Beijing (CN); Lili Chen, Beijing (CN); Hao Zhang, Beijing (CN)

(73) Assignees: BEIJING BOE OPTOELECTRONICS TECHNOLOGY CO., LTD., Beijing (CN); BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 16/872,545

(22) Filed: May 12, 2020

(65) Prior Publication Data
US 2021/0056719 A1 Feb. 25, 2021

(30) Foreign Application Priority Data
Aug. 22, 2019 (CN) .......................... 201910779058.3

(51) Int. Cl.
*G06T 7/579* (2017.01)
*G06F 3/01* (2006.01)
(Continued)

(52) U.S. Cl.
CPC .............. *G06T 7/579* (2017.01); *G06F 3/013* (2013.01); *G06K 9/00604* (2013.01); *G06K 9/2018* (2013.01); *G06T 3/0093* (2013.01)

(58) Field of Classification Search
CPC ....... G06T 7/579; G06T 3/0093; G03F 3/013; G06K 9/00604; G06K 9/2018
See application file for complete search history.

(56) References Cited

U.S. PATENT DOCUMENTS

| 2013/0069942 A1 | 3/2013 | Woo et al. |
| 2017/0169602 A1* | 6/2017 | Blackmon ............. G06T 15/005 |

(Continued)

FOREIGN PATENT DOCUMENTS

| CN | 102436671 A | 5/2012 |
| CN | 103081476 A | 5/2013 |

(Continued)

OTHER PUBLICATIONS

First Office Action dated Nov. 3, 2020 for Chinese Application No. 201910779058.3, 21 pages.

*Primary Examiner* — Antonio A Caschera
(74) *Attorney, Agent, or Firm* — Dave Law Group LLC; Raj S. Dave (57) ABSTRACT

A method for processing an image in a virtual reality display device comprises determining a gaze area and a non-gaze area in a display area of the virtual reality display device, performing, at a first time instant, a rendering process in the gaze area and the non-gaze area to generate a first image, performing a time warping process on the first image to generate a second image, based on attitude information of the virtual reality display device at a second time instant, and modifying the second image based on the movement information and attribute information of a motion object in the gaze area. The method can avoid problems caused by the (Continued)

time warping process, reduce delays, and avoid smearing or ghosting, and thus obtain a good display effect.

15 Claims, 5 Drawing Sheets

(51) Int. Cl.
*G06K 9/00* (2022.01)
*G06K 9/20* (2006.01)
*G06T 3/00* (2006.01)

(56) References Cited

U.S. PATENT DOCUMENTS

| | | |
|---|---|---|
| 2017/0243324 A1* | 8/2017 | Mierle .................... G06T 11/60 |
| 2017/0302918 A1 | 10/2017 | Mammou et al. |
| 2018/0039317 A1 | 2/2018 | Riguer |
| 2018/0365882 A1 | 12/2018 | Croxford et al. |

FOREIGN PATENT DOCUMENTS

| | | |
|---|---|---|
| CN | 106101533 A | 11/2016 |
| CN | 106412563 A | 2/2017 |
| CN | 107656617 A | 2/2018 |
| CN | 108139815 A | 6/2018 |
| CN | 108305326 A | 7/2018 |
| CN | 109144240 A | 1/2019 |

* cited by examiner

METHOD FOR PROCESSING IMAGE IN VIRTUAL REALITY DISPLAY DEVICE AND RELATED VIRTUAL REALITY DISPLAY DEVICE

CROSS-REFERENCE TO RELATED APPLICATION

The application claims the priority of China Patent Application No. 201910779058.3 filed on Aug. 22, 2019, and the entire disclosure of the above application is incorporated herein by reference as a part of this application.

FIELD

The present disclosure relates to the field of display technology, and in particular, to a method for processing an image in a virtual reality (VR) display device, the related VR display device, and a computer-readable storage medium.

BACKGROUND

VR technology is a 3D display technology newly developed in the 20th century. VR technology can use a computer to simulate virtual environments to give people an immersive feeling. With continuous development of social productivity, science and technology, VR technology has made tremendous progress and has gradually become a new field of science and technology. However, in the VR technology, image rendering has high requirements on a device, which requires powerful rendering capabilities, small device size, and strong processing capabilities. This makes a cost of VR display device higher and seriously affects popularization of VR technology.

Generally, a VR rendering process may comprise: a sensor collecting motion-related input data, filtering the collected input data and transmitting it to a controller through a cable; the controller sending the acquired input data to a driver, and the driver sending it to a graphics card for rendering; the graphics card submitting a rendering result to a display for display. In this process, there is Motion-To-Photon Latency (MTP Latency), which refers to a time spent from a start of a motion to a display of the corresponding motion picture on the display, that is, the time spent by the VR rendering process. In order to reduce a degree of smear, measures need to be taken to reduce MTP Latency.

MTP Latency can be reduced by performing Asynchronous Time Warp (ATW). For a static object in a scene, ATW would have a better display effect. However, for a motion object in the scene, ATW may cause a new problem of forming a ghost of the motion object and affecting a display effect of a motion picture.

SUMMARY

The embodiments of the present disclosure provide a method for processing an image in a virtual reality display device, a related virtual reality display device, and a computer-readable storage medium.

According to a first aspect of the present disclosure, a method for processing an image in a virtual reality display device is provided. The method comprises: determining a gaze area and a non-gaze area in a display area of the virtual reality display device; performing, at a first time instant, a rendering process in the gaze area and the non-gaze area to generate a first image; performing a time warping process on the first image to generate a second image, based on attitude information of the virtual reality display device at a second time instant; and modifying the second image, based on movement information and attribute information of a motion object in the gaze area.

In an embodiment of the present disclosure, performing a rendering process in the gaze area and the non-gaze area to generate a first image comprises: performing a first rendering process in the gaze area to generate a gaze area image; performing a second rendering process in the non-gaze area to generate a non-gaze area image; and merging the gaze area image and the non-gaze area image to generate the first image; wherein a resolution of the gaze area image is higher than a resolution of the non-gaze area image.

In an embodiment of the present disclosure, the movement information of the motion object comprises: an initial position of the motion object in the second image, a moving speed of the motion object, and a moving direction of the motion object.

In an embodiment of the present disclosure, modifying the second image comprises: identifying the motion object in the gaze area; predicting a possible position of the motion object at the second time instant based on the movement information; determining a blank area in the second image related to the motion object based on the initial position, the possible position and the attribute information; and determining new feature values of a plurality of pixels in the blank area based on original feature values of the plurality of pixels in the blank area.

In an embodiment of the present disclosure, the moving speed of the motion object is determined by: determining a difference in pixel positions of the motion object in two adjacent image frames; determining a scene speed of the motion object based on the difference in the pixel positions and an interval time between the two adjacent image frames; and determining the moving speed of the motion object based on the attitude information of the virtual reality display device and the scene speed.

In an embodiment of the present disclosure, determining new feature values of a plurality of pixels in the blank area comprises: for each pixel of the plurality of pixels, selecting a plurality of adjacent pixels of the pixel according to the moving direction; determining the weights of the plurality of adjacent pixels according to the moving direction; and determining a new feature value of the pixel based on the weights and the original feature values of the plurality of adjacent pixels.

In an embodiment of the present disclosure, the gaze area and the non-gaze area are determined based on an eye image of a user of the virtual reality display device.

In an embodiment of the present disclosure, determining the gaze area and the non-gaze area comprises: determining, for each eye, a center of an eye contour and a center of a pupil according to the eye image; determining a gaze focus on the virtual reality display device based on the center of the eye contour and the center of the pupil; determining the gaze area according to the gaze focus and a preset radius; and determining the non-gaze area to be an area in the display area excluding the gaze area.

According to a second aspect of the present disclosure, a virtual reality display device is provided. The virtual reality display device comprises: at least one processor; and a memory coupled to the at least one processor, the memory having a computer program stored therein, wherein the computer program, when executed by the at least one processor, causes the virtual reality display device to: determine a gaze area and a non-gaze area in a display area of the virtual reality display device; perform, at a first time instant, a render process in the gaze area and the non-gaze area to generate a first image; perform a time warping process on the first image to generate a second image based on attitude information of the virtual reality display device at a second time instant; and modify the second image, based on movement information and attribute information of a motion object in the gaze area.

In an embodiment of the present disclosure, the computer program, when executed by the at least one processor, causes the virtual reality display device to generate a first image by: performing a first rendering process in the gaze area to generate a gaze area image; performing a second rendering process in the non-gaze area to generate a non-gaze area image; and merging the gaze area image and the non-gaze area image to generate the first image; wherein a resolution of the gaze area image is higher than a resolution of the non-gaze area image.

In an embodiment of the present disclosure, the movement information of the motion object comprises: an initial position of the motion object in the second image, a moving speed of the motion object, and a moving direction of the motion object.

In an embodiment of the present disclosure, the computer program, when executed by the at least one processor, causes the virtual reality display device to modify the second image by: identifying the motion object in the gaze area; predicting a possible position of the motion object at the second time instant based on the movement information; determining a blank area in the second image related to the motion object based on the initial position, the possible position and the attribute information; and determining new feature values of a plurality of pixels in the blank area based on original feature values of the plurality of pixels in the blank area.

In an embodiment of the present disclosure, wherein the computer program, when executed by the at least one processor, causes the virtual reality display device to determine the moving speed of the motion object by: determining a difference in pixel positions of the motion object in two adjacent image frames; determining a scene speed of the motion object based on the difference in the pixel positions and an interval time between the two adjacent image frames; and determining the moving speed of the motion object based on the attitude information of the virtual reality display device and the scene speed.

In an embodiment of the present disclosure, the computer program, when executed by the at least one processor, causes the virtual reality display device to determine new feature values of a plurality of pixels in the blank area by: for each pixel of the plurality of pixels, selecting a plurality of adjacent pixels of the pixel according to the moving direction; determining the weights of the plurality of adjacent pixels according to the moving direction; and determining a new feature value of the pixel based on the weights and the original feature values of the plurality of adjacent pixels.

In an embodiment of the present disclosure, the gaze area and the non-gaze area are determined based on an eye image of a user of the virtual reality display device.

In an embodiment of the present disclosure, the computer program, when executed by the at least one processor, causes the virtual reality display device to determine the gaze area and the non-gaze area by: determining, for each eye, a center of an eye contour and a center of a pupil according to the eye image; determining a gaze focus on the virtual reality display device based on the center of the eye contour and the center of the pupil; determining the gaze area according to the gaze focus and a preset radius; and determining the non-gaze area to be an area in the display area excluding the gaze area.

In an embodiment of the present disclosure, the virtual reality display device further comprises: an infrared transmitter coupled to the virtual reality display device and configured to emit infrared light toward eyes of a user of the virtual reality display device; and a camera coupled to the virtual reality display device and configured to receive infrared light reflected from the eyes of a user of the virtual reality display device to generate an eye image.

In an embodiment of the present disclosure, the virtual reality display device comprises a head-mounted virtual reality display device.

According to a third aspect of the present disclosure, a computer-readable storage medium is provided. A computer program is stored on the computer-readable storage medium, where the computer program implements the method of the first aspect of the present disclosure when executed by the processor.

BRIEF DESCRIPTION OF THE DRAWINGS

In order to more clearly explain the technical solutions in the embodiments of the present disclosure, the drawings required for the description of the embodiments of the present disclosure will be briefly introduced below.

DETAILED DESCRIPTION

The embodiments of the present disclosure are described in detail below. Examples of the embodiments are shown in the drawings, in which the same or similar reference numerals indicate the same or similar elements or elements having the same or similar functions throughout. The embodiments described below with reference to the drawings are exemplary, and are only used to explain the present disclosure, and cannot be construed as limiting the present disclosure.

Those skilled in the art can understand that unless specifically stated, the singular forms "a", "an", "said" and "the" used herein may also comprise the plural forms. It should be further understood that the word "comprising" used in the specification of the present disclosure refers to the presence of the described features, integers, steps, operations, elements and/or components, but does not exclude the presence or addition of one or more other features, integers, steps, operations, elements, components, and/or their combination. It should be understood that when an element is referred to as being "connected" or "coupled" to another element, it can be directly connected or coupled to the other element, or intervening elements may also be present. In addition, "connected" or "coupled" as used herein may comprise wirelessly connected or wirelessly coupled. The expression "and/or" as used herein comprises all or any unit and all combinations of one or more associated listed items.

The rendering process in the VR display device may comprise the following steps:

(1) a sensor of the VR display device collects motion-related input data;

(2) the sensor filters the collected input data and transmits it to a controller through a cable;

(3) the controller sends the acquired input data to a driver, and the driver sends it to a graphics card for rendering;

(4) the graphics card submits rendered results to the display for display.

Generally, rendering refers to the process of generating images from a model using software. Specifically, rendering is the process of projecting a model in a three-dimensional scene into a two-dimensional digital image according to preset environment, lighting, materials, and rendering parameters. The rendering engine on the VR display device may specifically comprise a Graphics Processing Unit (GPU), a Field Programmable Gate Array (FPGA), or a dedicated AI chip. In the embodiments of the present disclosure, the rendering engine is described by taking the GPU as an example.

In order to ensure that the rendering frequency of the GPU matches the refresh rate of the display of the VR display device, a synchronization signal is required. At present, the refresh rate of a display is generally taken as a synchronization signal, which is called a vertical synchronization (Vsync) signal. When the Vsync signal arrives, the tracker in the VR display device starts to collect signal and transfer it to the Central Processing Unit (CPU) for processing. The CPU hands over the processed data to the GPU for rendering. After rendering by GPU, it waits for the next Vsync signal to arrive. The GPU projects the rendered image onto the display for display, that is, the display starts to refresh and displays a new image. It can be seen that the delay in the VR display device is approximately twice of the interval time between two Vsync signals. Assuming that the refresh rate of the display is 90 Hz, the delay in the VR display device is approximately 22.22 milliseconds (1000/90*2=22.22 ms). The smaller the delay in the VR display device, the less the smear is generated, and the better the user experience of the VR display device is. The delay in VR display devices can be reduced, but it cannot be avoided at all.

To reduce the delay described above, a time warp (TW) method is adopted. Time warp is a technique used to modify image frames. A specific method of TW is Asynchronous Time Warp (ATW). The ATW process and the main rendering process operate in parallel (also called asynchronous operation), and the ATW process generates new images based on the images generated by the main rendering process. When the virtual reality display device is actually used, the rendering of the scene is delayed because the user's head moves too fast. In other words, the user's head has been turned, but the image has not been rendered, or the image of the previous frame is rendered. Before the image is sent to the display, the delay described above can be resolved by time warping the image. If the objects in the scene are static and the VR display device is also static, the TW process can greatly reduce the delay and achieve good results. If the objects in the scene are motion, or the VR display device is motion, all intermediate frames appear to be frozen. This is because the new image generated by TW is only generated based on the image of previous frame, so the movement information of the motion object is lacking. Therefore, for motion objects, it is easy to cause jitter, thereby forming a smear or ghost image for the motion objects.

To solve the problem of smear or ghost, the embodiments of the present disclosure provide the method for processing an image in a VR display device, the related virtual reality display device and computer-readable storage medium.

Figure 1:
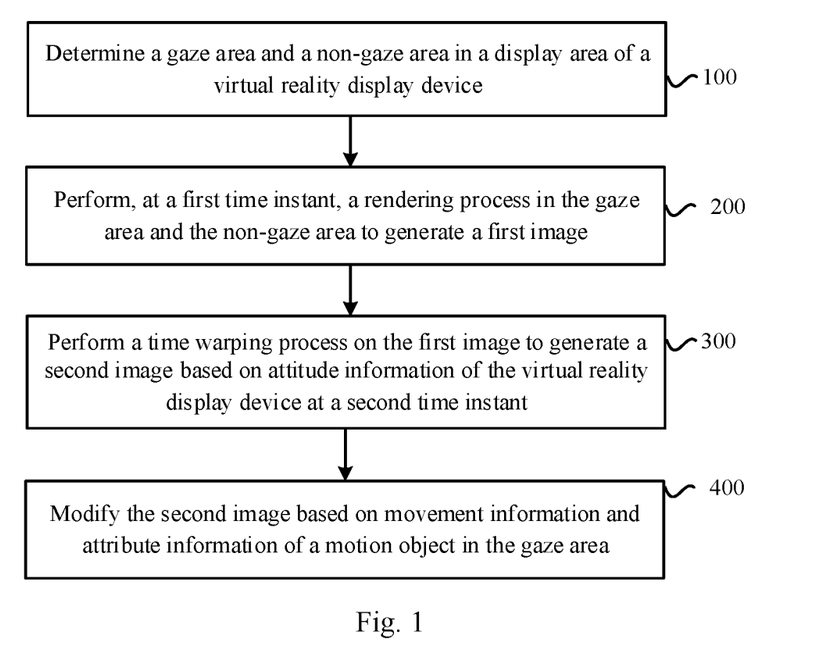
FIG. 1 is a schematic flowchart of the method for processing an image in a VR display device according to an embodiment of the present disclosure.

FIG. 1 is a schematic flowchart of the method for processing an image in a VR display device according to an embodiment of the present disclosure. As shown in FIG. 1, in block 100, a gaze area and a non-gaze area are determined in a display area of the virtual reality display device. In the embodiments of the present disclosure, the gaze area and the non-gaze area may be determined based on an eye image of a user of the virtual reality display device.

In an embodiment of the present disclosure, the eye image of the user may be collected through two infrared transmitters and a camera (e.g. an infrared camera) in the virtual reality display device. Two infrared transmitters can emit infrared light towards the left and right eyes respectively. The infrared light irradiated on the eyes is reflected into the camera to obtain the eye image.

Figure 2:
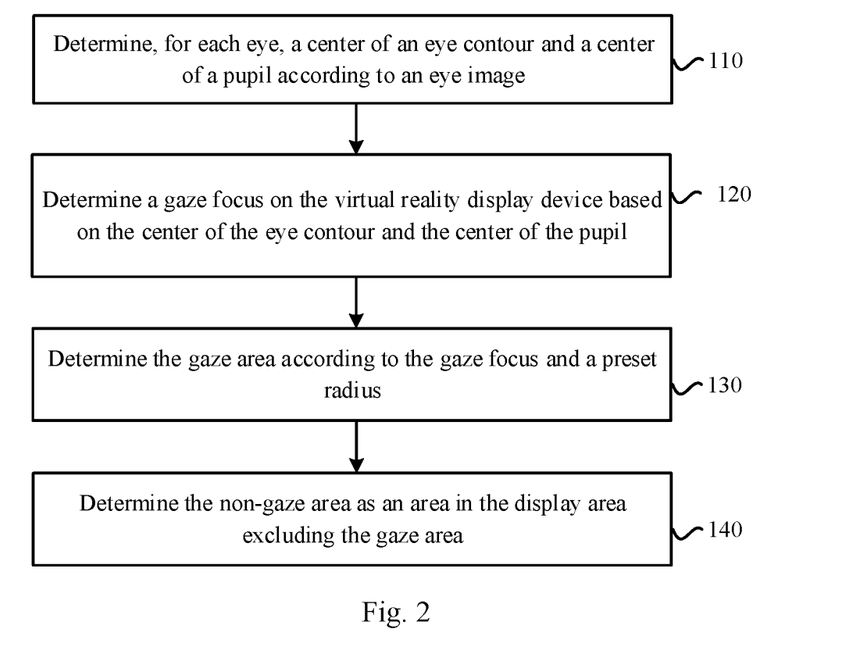
FIG. 2 is a schematic flowchart of a process for determining the gaze area and the non-gaze area.

FIG. 2 is a schematic flowchart of a process for determining the gaze area and the non-gaze area. As shown in FIG. 2, in block 110, a center of the eye contour and a center of the pupil of each eye are determined based on the eye image. In an embodiment of the present disclosure, the eye image may be subjected to binary processing to obtain a black-and-white eye image, and the eye contour and the pupil in the eye contour, in the black-and-white eye image, are identified by image recognition technology. Based on the recognized eye contour and pupil, the center of the eye contour and the center of the pupil of each eye can be determined.

Figure 3:
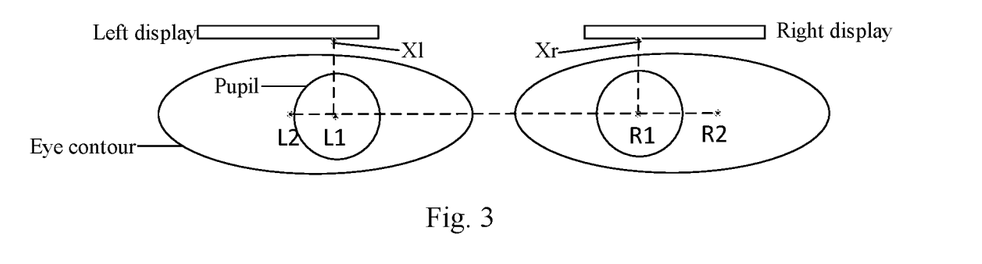
FIG. 3 is a schematic diagram illustrating a relationship between the center of the eye contour, the center of the pupil, and the gaze focus.

In block 120, a gaze focus on the virtual reality display device is determined based on the center of eye contour and the center of the pupil. FIG. 3 is a schematic diagram illustrating a relationship between the center of the eye contour, the center of the pupil, and the gaze focus. As shown in FIG. 3, based on the center of eye contour L2 and the center of the pupil L1 of the left eye, it is determined that the gaze focus of the left eye on the left display of the virtual reality display device is xl, and based on the center of eye contour R2 and the center of the pupil R1 of the right eye, it is determined that the gaze focus of the right eye on the right display of the virtual reality display device is xr.

In block 130, the gaze area is determined according to the gaze focus and the preset radius. In an embodiment of the present disclosure, the gaze focus can be used as a center, and a preset radius can be used as a radius to make a circle (not shown in the figure), and the area contained in the circle can be used as the gaze area. In one example, the preset radius may be a quarter of the height of the display.

In block 140, the area in the display area of the display excluding the gaze area may be determined as the non-gaze area.

Figure 4:
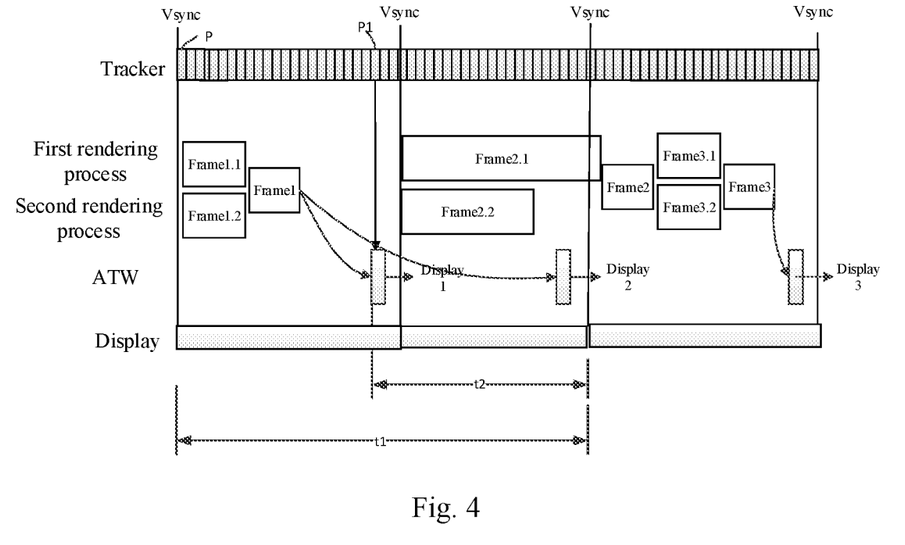
FIG. 4 is a schematic diagram illustrating a process of processing the image in the VR display device.

Referring to FIG. 1 again, in block 200, at the first time instant, a rendering process is performed in the gaze area and the non-gaze area to generate a first image. FIG. 4 is a schematic diagram illustrating a process of processing the image in a virtual reality display device.

As shown in FIG. 4, at the first time instant P, a first rendering process is performed in the gaze area to generate the gaze area image Frame1.1, and a second rendering process is performed in the non-gaze area to generate the non-gaze area image Frame1.2. The gaze area image Frame 1.1 and the non-gaze area image Frame 1.2 are merged to generate the first image Frame1.

When the user views an image, the user is more sensitive to the resolution of the gaze area image, but not sensitive to the resolution of the non-gaze area image. In the embodiment of the present disclosure, the resolution of the gaze area image is higher than the resolution of the non-gaze area image. In one example, each pixel in the gaze area may be rendered, and a portion of the pixels in the non-gaze area may be rendered.

It should be noted that the first rendering process and the second rendering process can be performed simultaneously. Due to their different workloads, the time required for the first rendering process and the second rendering process are also different. In order to be able to merge the gaze area image and the non-gaze area image, it must be ensured that when the two images are merged, both rendering processes have to be completed. After performing the first rendering process, the processor in the virtual reality display device may send out a beacon, and after performing the second rendering process, the processor may send out another beacon. The subsequent processing of the rendering process will start only if the two beacons are received.

Rendering the gaze area and the non-gaze area separately can reduce the rendering pressure of the processor (e.g. a graphics processor) in the virtual reality display device, improve rendering efficiency, and can also reduce the performance requirements for the processor and reduce the cost of the virtual reality display device.

Referring to FIG. 1 again, in block 300, based on the attitude information of the virtual reality display device at the second time instant, a time warping process is performed on the first image to generate a second image. In the embodiment shown in FIG. 4, based on the attitude information of the virtual reality display device at the second time instant P1, a time warping (TW) process may be performed on the first image Frame1 to generate the second image.

Figure 5:
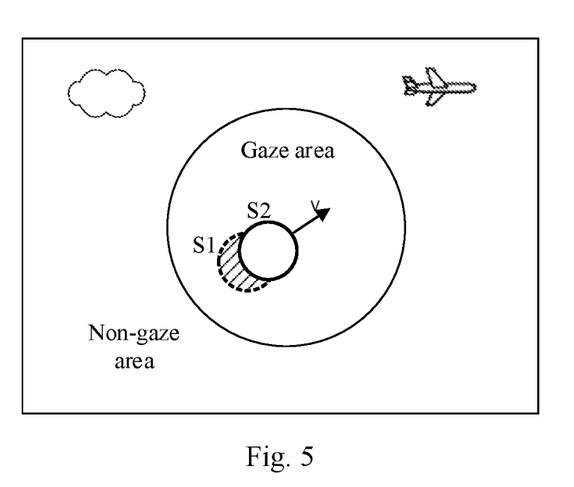
FIG. 5 is a diagram illustrating the second image according to an embodiment of the present disclosure.

FIG. 5 is a diagram illustrating the second image according to an embodiment of the present disclosure. As shown in FIG. 5, the non-gaze area of the second image comprises a cloud and an airplane, and the motion object in the gaze area is a football moving in the air. Since the football is located at the position S1 in the image and the football has moved to the position S2 in the rendered scene, the smear usually appears at the position remained after the football moves. In the embodiment of the present disclosure, the area remained after the motion object moves may be referred to as a blank area, as shown in the shaded area in FIG. 5. In fact, after the motion object moves, the blank area in the second image simply means that there is no motion object in the blank area, and it does not mean that the blank area is blank. The blank area may be in a white or transparent state and still have a background image, so the second image needs to be modified.

Back to FIG. 1, in block 400, the second image is modified based on the movement information and attribute information of the motion object in the gaze area. In an embodiment of the present disclosure, the movement information of the motion object may comprise the initial position of the motion object in the second image, the moving speed of the motion object, and the moving direction of the motion object. In the embodiment shown in FIG. 5, the initial position of the football is S1, the moving speed of the football is v, and the moving direction of the football is the direction indicated by the arrow.

Figure 6:
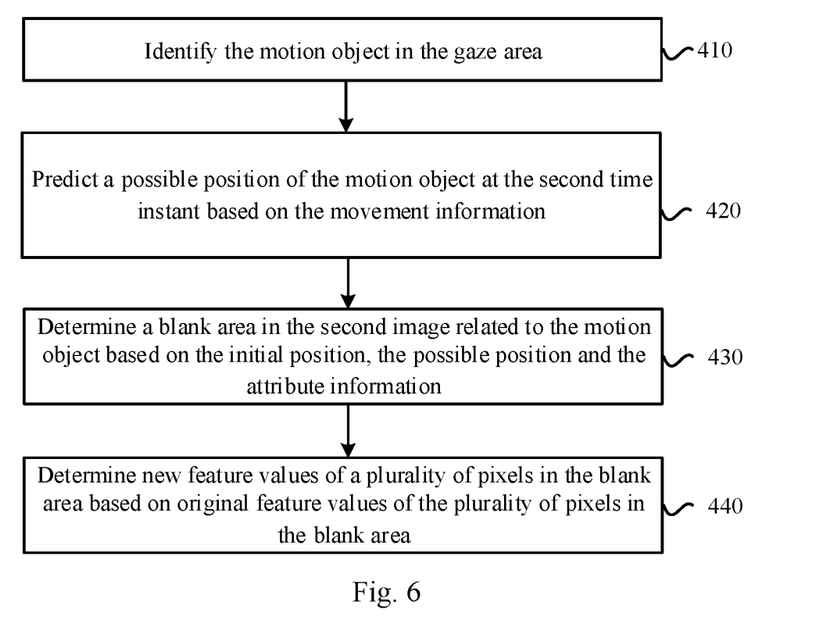
FIG. 6 is a schematic flowchart of a process for modifying the second image according to an embodiment of the present disclosure.

FIG. 6 is a schematic flowchart of a process for modifying a second image according to an embodiment of the present disclosure. In block 410, a motion object in the gaze area in the second image is identified. In the embodiment shown in FIG. 5, an image recognition technology may be used to identify the motion object in the gaze area as the football.

In block 420, a possible position of the motion object at the second time instant may be predicted based on the movement information of the motion object. In the embodiment shown in FIG. 5, the possible position of the football can be predicted as S2 at the second time instant according to the initial position S1 of the football, the moving speed v, the moving direction (the direction indicated by the arrow), and the time difference between the second time instant and the first time instant.

The moving speed of the motion object can be predetermined by the following procedure. Since the motion object is in motion, there is a difference in the pixel position of the corresponding motion object in the gaze area in two adjacent image frames. The difference is the displacement of the motion object in the interval between two adjacent frames. By dividing the difference by the interval between two adjacent frames, the scene speed of the motion object can be determined. Those skilled in the art can understand that the scene speed is the moving speed of the motion object relative to the rendered scene. However, the rendered scene is also moving, and the moving speed of the scene can be determined by acquiring attitude information of the virtual reality display device. In an embodiment of the present disclosure, the attitude information may comprise angular velocity and attitude parameters. Based on the scene speed of the motion object and attitude information, the moving speed of the motion object can be determined, that is, the actual moving speed of the motion object.

Referring to FIG. 6 again, in block 430, based on the initial position, the possible position, and the attribute information, the blank area in the second image related to the motion object is determined. In an embodiment of the present disclosure, the attribute information of the motion object may comprise a shape parameter of the motion object, a size of the motion object, and other parameters that can describe the motion object. In the embodiment shown in FIG. 5, according to the shape parameter and size of the football, the initial position S1 and the possible position S2, it can be determined that the blank area is the area shown by the shaded area in FIG. 5.

Figure 7:
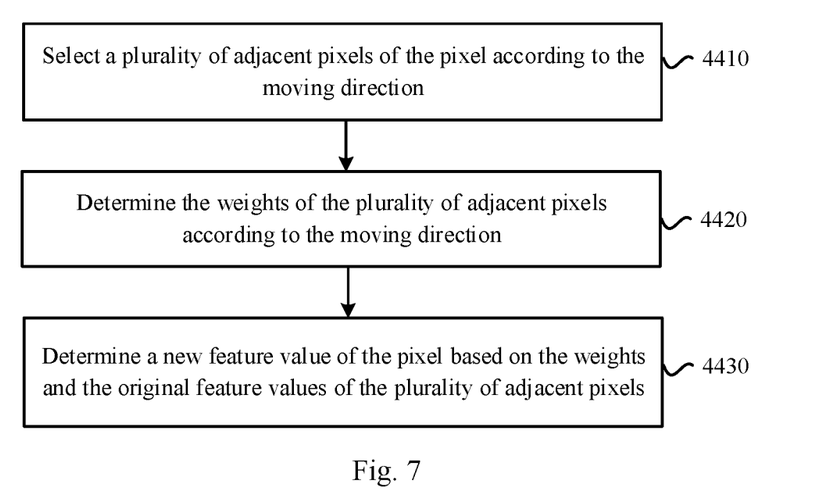
FIG. 7 is a schematic flowchart of a process for determining the new feature value according to an embodiment of the present disclosure.
Figure 8:
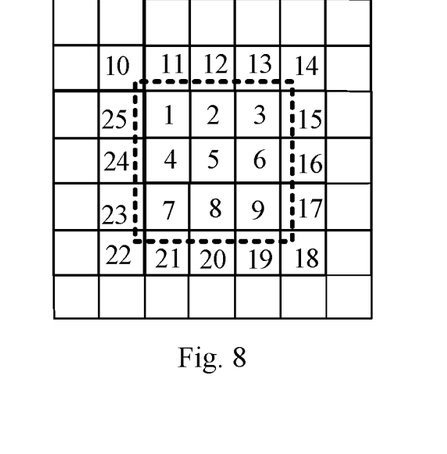
FIG. 8 is a diagram illustrating a principle for determining the new feature value according to an embodiment of the present disclosure.

In block 440, based on the original feature values of the plurality of pixels in the blank area, the new feature values of the plurality of pixels in the blank area are determined. FIG. 7 is a schematic flowchart of a process for determining new feature values according to an embodiment of the present disclosure. FIG. 8 is a diagram illustrating a principle for determining the new feature values according to an embodiment of the present disclosure. As shown in FIG. 8, the area surrounded by the dotted line is a blank area related to the motion object, and the blank area comprises pixels 1-9. The following describes in detail how to determine the new feature value for each pixel in the blank area in conjunction with FIGS. 7 and 8.

As shown in FIG. 7, in block 4410, a plurality of adjacent pixels of the pixel may be selected according to the moving direction. In the embodiment shown in FIG. 8, for the pixel 1 in the blank area that is close to the edge, if the moving direction of the motion object is to the right, then the adjacent pixels of the pixel 1 are selected as the adjacent pixels 2, 4 and 5; if the moving direction of the motion object is to the left, the adjacent pixels of the pixel 1 are selected as the adjacent pixels 10, 11 and 25. For pixel 5 in the blank area that is not close to the edge, the adjacent pixels of the pixel 5 are selected as the adjacent pixels 1-4 and 6-9 according to the moving direction of the motion object.

Referring to FIG. 7 again, in block 4420, according to the moving direction, the corresponding weights of the plurality of adjacent pixels are determined. In the embodiment of the present disclosure, the adjacent pixels toward the moving direction have a greater weight. In the embodiment shown in FIG. 8, for the pixel 1 in the blank area that is close to the edge, if the moving direction is to the right, the weights of the adjacent pixels 2 and 5 are greater than the weight of the adjacent pixels 4. Then, if the moving direction is to the left, the weights of the adjacent pixels 10 and the adjacent pixels 25 are greater than the weight of the adjacent pixels 11. For the pixel 5 in the blank area that is not close to the edge, if the moving direction is to the right, the weight of the adjacent pixels 1, 4, 7 can be ⅙, the weight of the adjacent pixels 2, 8 can be ⅓, and the weight of the adjacent pixels 3, 6 and 9 can be ½.

Referring to FIG. 7 again, in block 4430, based on the corresponding weights and the corresponding original feature values of the plurality of adjacent pixels, a new feature value of the pixel is determined. In the embodiment shown in FIG. 8, the new feature value M of the pixel 5 is:

$$M=(m_1+m_4+m_7)\cdot\tfrac{1}{6}+(m_2+m_8)\cdot\tfrac{1}{3}+(m_3+m_6+m_9)\cdot\tfrac{1}{2}$$

Where M is the new feature value of pixel 5 in the blank area, and mi (i=1, 2, 3, 4, 6, 7, 8, 9) is the original feature value of adjacent pixel i.

According to the above method, the new feature value of the pixel in the blank area is determined, and the original feature value is replaced with the new feature value of the pixel, thereby modifying the second image.

To facilitate understanding of the above-mentioned processing procedures of the embodiments of the present disclosure, the content combined in FIG. 4 and FIG. 5 is taken as an example for description. At time instant P, the Tracker collects data, and obtains the data for generating Frame 1.1 in the gaze area and the data for generating Frame 1.2 in the non-gaze area. A first rendering process is performed in the gaze area to generate the gaze area image Frame1.1, and a second rendering process is performed in the non-gaze area to generate the non-gaze area image Frame1.2. The Frame1.1 and Frame1.2 are merged to obtain the first image Frame1. Frame1 is output as the second image after the ATW process and displayed on Display1. Display1 can display the football at position S1. S1 is the position of the motion object after the previous movement. At time instant P1, GPU rendering finished, and Tracker collects data again. Using the same method as generating Frame1, Frame2 is obtained. In this way, the time instant t2 (i.e. MTP) is less than the time instant t1.

If Frame 2 has not been rendered before ATW, the previous frame is used to perform the ATW process and then output as the second image. In FIG. 5, the time required for Frame2.1 generated by the first rendering process exceeds the time interval between two Vsyncs, the image Frame1 which is the previous frame is used to perform the ATW process and then output as the second image, and displayed on the Display2. At this time instant, Display2 still displays the football at position S1. When Frame3 is collected and generated, Frame2 is overwritten, and Frame2 is cleared and the Frame3 is displayed on Display3. At this time instant, Display3 can display the football at position S2.

With the above method provided by the embodiments of the present disclosure, the second image can be modified based on the movement information and attribute information of the motion object, which can avoid the problems caused by the time warping process, reduce the delay and jitter greatly. The smearing or ghosting of motion objects formed in the second image can be avoided, and thus a good display effect can be achieved.

Figure 9:
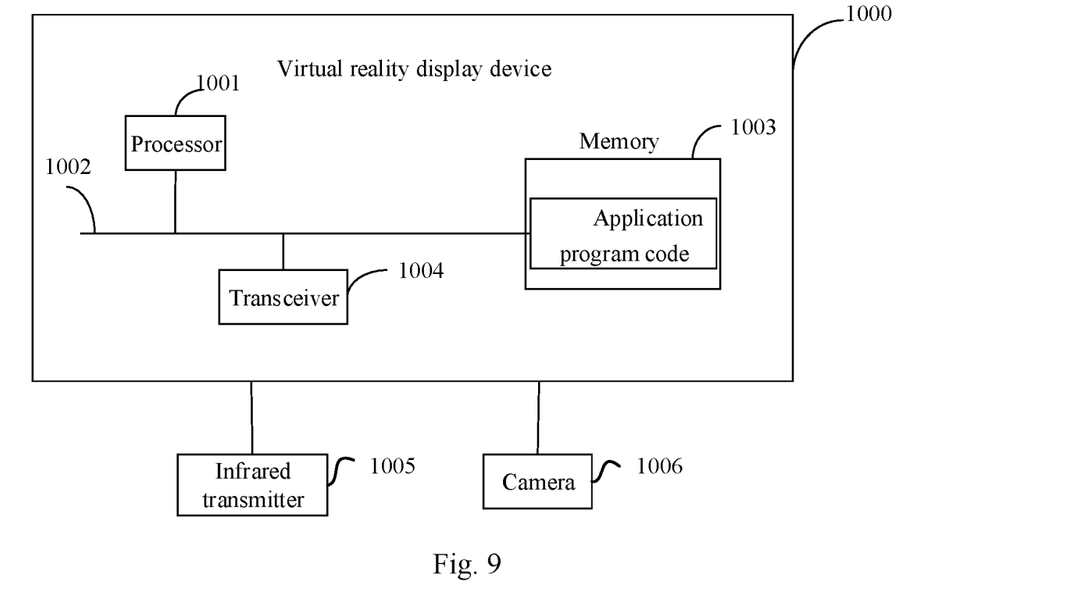
FIG. 9 is a schematic block diagram of the VR display device according to an embodiment of the present disclosure.

FIG. 9 is a schematic block diagram of a virtual reality display device 1000 according to an embodiment of the present disclosure. In this embodiment, the virtual reality display device 1000 is the same as the virtual reality display device in the embodiment shown in FIG. 1. As shown in FIG. 9, the virtual reality display device 1000 comprises one or more processors 1001, memory 1003, transceiver 1004, infrared transmitter 1005, and camera 1006. The memory 1003 stores a computer program, and when the computer program is executed by the processor 1001, the virtual reality display device 1000 may execute the method for processing an image in the virtual reality display device as shown in FIG. 1. The processor 1001 is connected to the memory 1003, for example, via the bus 1002. The infrared transmitter 1005 and the camera 1006 are respectively coupled with the virtual reality display device 1000. It should be noted that in actual applications, the transceiver 1004 is not limited to one, and the structure of the virtual reality display device 1000 does not constitute a limitation on the embodiments of the present disclosure.

The processor 1001 may comprise at least one of the following: CPU (Central Processing Unit), GPU (Graphics Processing Unit), general-purpose processor, DSP (Digital Signal Processor), ASIC (Application Specific Integrated Circuit), FPGA (Field Programmable Gate Array) or other programmable logic devices, transistor logic devices, hardware components, or any combination thereof. They can implement or execute various exemplary logical blocks, modules, and circuits described in connection with the present disclosure. The processor 1001 may also be a combination that realizes a calculation function, for example, comprises a combination of one or more microprocessor, a combination of a DSP and a microprocessor, and so on.

The bus 1002 may comprise a path to transfer information between the above components. The bus 1002 may be a PCI (Peripheral Component Interconnect) bus or an EISA (Extended Industry Standard Architecture) bus. The bus 1002 can be classified as an address bus, a data bus, and a control bus. For ease of representation, only a thick line is used in FIG. 9, but it does not mean that there is only one bus or one type of bus.

The memory 1003 may be a ROM (Read Only Memory) or other types of static storage devices that can store static information and instructions, a RAM (Random Access Memory), or other types of dynamic storage devices that can store information and instructions, and it can also be EEPROM (Electrically Erasable Programmable Read Only Memory), CD-ROM (Compact Disc Read Only Memory) or other memory storage, disc storage (comprising compression Optical discs, laser discs, optical discs, digital versatile discs, Blu-ray discs, etc.), magnetic disk storage media or other magnetic storage devices, or any other media that can be used to carry or store the desired program code in the form of instructions or data structures and can be accessed by a computer, but not limited to this.

The memory 1003 is used to store application program code that executes the embodiments of the present disclosure, and is controlled and executed by the processor 1001. The processor 1001 is configured to execute the application program code stored in the memory 1003 to implement the content shown in the foregoing method embodiment.

In an embodiment of the present disclosure, the infrared transmitter 1005 may be configured to emit infrared light toward the eyes of the user of the virtual reality display device 1000.

In an embodiment of the present disclosure, the camera 1006 may be configured to receive infrared light reflected from the eyes of the user to generate eye images.

In the embodiments of the present disclosure, the virtual reality display device comprises, but is not limited to, a virtual reality head-mounted display device.

According to the embodiments of the present disclosure, the second image can be modified based on the movement information and attribute information of the motion object, which can avoid the problems caused by the time warping process, reduce the delay and jitter greatly. The smearing or ghosting of motion objects formed can be avoided, thus the display performance of virtual reality display devices can be significantly improved.

Embodiments of the present disclosure also provide a computer-readable storage medium that stores a computer program, which when run on a computer, enables the computer to execute the corresponding content in the foregoing method embodiments. With the computer-readable storage medium provided by the embodiments of the present disclosure, which can avoid the problems caused by the time warping process, by implementing the content shown in the foregoing method embodiments and modifying the second image based on the movement information and attribute information of the motion object. The delay and the jitter can be greatly reduced. The smearing or ghosting of motion objects can be avoided, thus the display performance of virtual reality display devices can be significantly improved.

It should be understood that although the steps in the flowchart of the drawings are displayed in order according to the arrows, the steps are not necessarily executed in the order indicated by the arrows. Unless there is a clear description in this disclosure, there is no strict order limitation for the execution of these steps, and they can be executed in other orders. Moreover, at least a part of the steps in the flowchart of the drawings may comprise multiple sub-steps or multiple stages. These sub-steps or stages are not necessarily executed at the same time, but may be executed at different times, and the order of execution is not necessarily carried out sequentially, but may be executed in turn or alternately with at least a part of other steps or sub-steps or stages of other steps.

The illustrating embodiments of the present disclosure have been described above, and those of ordinary skill in the art will appreciate that, without departing from the principles of the present disclosure, several modifications and changes can be made. These modifications and changes also should be regarded as the scope of protection of this disclosure.

What is claimed is:

1. A method for processing an image in a virtual reality display device, comprising:
    determining a gaze area and a non-gaze area in a display area of the virtual reality display device;
    performing, at a first time instant, a rendering process in the gaze area and the non-gaze area to generate a first image;
    performing a time warping process on the first image to generate a second image, based on attitude information of the virtual reality display device at a second time instant; and
    modifying the second image based on movement information and attribute information of a motion object in the second image in the gaze area,
    wherein the movement information of the motion object comprises:
    an initial position of the motion object in the second image, a moving speed of the motion object, and a moving direction of the motion object,
    wherein modifying the second image comprises: identifying the motion object in the gaze area;
    predicting a possible position of the motion object at the second time instant based on the movement information; determining a blank area in the second image related to the motion object based on the initial position, the possible position and the attribute information; and determining new feature values of a plurality of pixels in the blank area based on original feature values of the plurality of pixels in the blank area.

2. The method of claim 1, wherein performing a rendering process in the gaze area and the non-gaze area to generate a first image comprises:
    performing a first rendering process in the gaze area to generate a gaze area image;
    performing a second rendering process in the non-gaze area to generate a non-gaze area image; and
    merging the gaze area image and the non-gaze area image to generate the first image;
    wherein a resolution of the gaze area image is higher than a resolution of the non-gaze area image.

3. The method of claim 1, wherein the moving speed of the motion object is determined by:
    determining a difference in pixel positions of the motion object in two adjacent image frames;
    determining a scene speed of the motion object based on the difference in the pixel positions and an interval time between the two adjacent image frames; and determining the moving speed of the motion object based on the attitude information of the virtual reality display device and the scene speed.

4. The method of claim 1, wherein determining new feature values of a plurality of pixels in the blank area comprises:
    for each pixel of the plurality of pixels, selecting a plurality of adjacent pixels of the pixel according to the moving direction; determining the weights of the plurality of adjacent pixels according to the moving direction; and determining a new feature value of the pixel based on the weights and the original feature values of the plurality of adjacent pixels.

5. The method of claim 1, wherein the gaze area and the non-gaze area are determined based on an eye image of a user of the virtual reality display device.

6. The method of claim 5, wherein determining the gaze area and the non-gaze area comprises:
    determining, for each eye, a center of an eye contour and a center of a pupil according to the eye image; determining a gaze focus on the virtual reality display device based on the center of the eye contour and the center of the pupil; determining the gaze area according to the gaze focus and a preset radius; and determining the non-gaze area as an area in the display area excluding the gaze area.

7. A non-transitory computer-readable storage medium on which a computer program is stored, wherein the computer program implements the method of claim 1 when executed by a processor.

8. A virtual reality display device, comprising:
at least one processor; and a memory coupled to the at least one processor, the memory having a computer program stored therein, wherein the computer program, when executed by the at least one processor, causes the virtual reality display device to:
determine a gaze area and a non-gaze area in a display area of the virtual reality display device;
perform, at a first time instant, a rendering process in the gaze area and the non-gaze area to generate a first image; perform a time warping process on the first image to generate a second image, based on attitude information of the virtual reality display device at a second time instant;
and modify the second image based on movement information and attribute information of a motion object in the second image in the gaze area,
wherein the movement information of the motion object comprises:
an initial position of the motion object in the second image, a moving speed of the motion object, and a moving direction of the motion object,
wherein the computer program, when executed by the at least one processor, causes the virtual reality display device to modify the second image by:
identifying the motion object in the gaze area; predicting a possible position of the motion object at the second time instant based on the movement information; determining a blank area in the second image related to the motion object based on the initial position, the possible position and the attribute information; and determining new feature values of a plurality of pixels in the blank area based on original feature values of the plurality of pixels in the blank area.

9. The virtual reality display device of claim 8, wherein the computer program, when executed by the at least one processor, causes the virtual reality display device to generate the first image by:
performing a first rendering process in the gaze area to generate a gaze area image; performing a second rendering process in the non-gaze area to generate a non-gaze area image; and merging the gaze area image and the non-gaze area image to generate the first image; wherein a resolution of the gaze area image is higher than a resolution of the non-gaze area image.

10. The virtual reality display device of claim 8, wherein the computer program, when executed by the at least one processor, causes the virtual reality display device to determine the moving speed of the motion object by:
determining a difference in pixel positions of the motion object in two adjacent image frames;
determining a scene speed of the motion object based on the difference in the pixel positions and an interval time between the two adjacent image frames; and determining the moving speed of the motion object based on the attitude information of the virtual reality display device and the scene speed.

11. The virtual reality display device of claim 8, wherein the computer program, when executed by the at least one processor, causes the virtual reality display device to determine new feature values of a plurality of pixels in the blank area by:
for each pixel of the plurality of pixels, selecting a plurality of adjacent pixels of the pixel according to the moving direction; determining the weights of the plurality of adjacent pixels according to the moving direction; and determining a new feature value of the pixel based on the weights and the original feature values of the plurality of adjacent pixels.

12. The virtual reality display device of claim 8, wherein the gaze area and the non-gaze area are determined based on an eye image of a user of the virtual reality display device.

13. The virtual reality display device of claim 12, wherein the computer program, when executed by the at least one processor, causes the virtual reality display device to determine the gaze area and the non-gaze area by:
determining, for each eye, a center of an eye contour and a center of a pupil according to the eye image; determining a gaze focus on the virtual reality display device based on the center of the eye contour and the center of the pupil; determining the gaze area according to the gaze focus and a preset radius; and determining the non-gaze area as an area in the display area excluding the gaze area.

14. The virtual reality display device of claim 6, further comprising:
an infrared transmitter coupled to the virtual reality display device and configured to emit infrared light toward eyes of a user of the virtual reality display device; and
a camera coupled to the virtual reality display device and configured to receive infrared light reflected from the eyes of a user of the virtual reality display device to generate an eye image.

15. The virtual reality display device of claim 8, wherein the virtual reality display device comprises a head-mounted virtual reality display device.

* * * * *